United States Patent Office 3,271,244
Patented Sept. 6, 1966

3,271,244
METHOD OF CONTROLLING BACTERIA AND FUNGI WITH PHOSPHORIMIDIC TRIAMIDE SALTS
Harold F. Wilson, Moorestown, N.J., and Robert L. Skiles, Warminster, Pa., assignors to Rohm & Haas Company, Philadelphia, Pa., a corporation of Delaware
No Drawing. Filed May 3, 1965, Ser. No. 452,892
8 Claims. (Cl. 167—30)

This invention is concerned with fungicidal and bactericidal compositions containing aralkyl phosphorimidic triamide salts as the active ingredients and their use in the control of fungal and bacterial diseases of plants.

The aralkyl phosphorimidic triamide salts may be represented by the formula

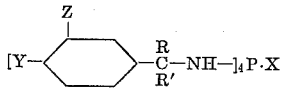

(I)

wherein

R and R' are hydrogen or methyl;
Y is hydrogen, chlorine, bromine, lower alkyl or lower alkoxy;
Z is hydrogen; and when
Y is hydrogen, Z is chlorine, bromine, lower alkyl or lower alkoxy; and
X is a salt-forming anion.

Lower alkyl and lower alkoxy groups encompass those groups wherein there is a total of 1 to 4 carbon atoms, such as methyl, ethyl, propyl, isopropyl, butyl, tert-butyl, methoxy, ethoxy, propoxy, butoxy and isobutoxy.

Salt-forming anions include the inorganic groups borate, bromide, chloride, fluoborate, iodide, nitrate, phosphate, sulfate, and organic groups such as acetate, oxalate, phthalate, carbamates, carbonates, dithiocarbamates, sulfonates, thioxanthates, and xanthates. Also useful as a source of salt-forming anions are polycarboxylic acids. This is meant to include polymeric acids such as dimers, trimers and higher polymers of acrylic and methacrylic acids and acids formed by copolymerization. Suitable copolymeric structures include those made by copolymerizing lower alkyl acrylates and methacrylates, such as butyl acrylate or methyl methacrylate, with copolymerizable unsaturated aliphatic acids, such as acrylic acid, methacrylic acid, α-methyleneglutaric acid, and β-methacryloxypropionic acid. The anions are preferably chosen on the basis that they do not contribute to phytotoxicity to plant foliage, i.e. that they are agronomically acceptable.

The aralkyl phosphorimidic triamide salts of this invention have been found to be excellent fungicides and bactericides against a variety of fungal and bacterial diseases attacking agronomic and horticultural crops, particularly vegetables and fruits. They are especially valuable because they achieve high activity at low dosages and are relatively safe on plants, thus accomplishing a combination of economy and plant tolerance.

Representative compounds which are the active fungicides of this invention include the following and for these X is as defined above and $C_6H_5$ and $C_6H_4$ are phenyl or substituted phenyl groups.

($C_6H_5CH_2NH$)$_4$P·X
($C_6H_5$(CH$_3$)CHNH)$_4$P·X
($C_6H_5$(CH$_3$)$_2$CNH)$_4$P·X
(4-ClC$_6$H$_4$CH$_2$NH)$_4$P·X
(4-BrC$_6$H$_4$CH$_2$NH)$_4$P·X
(4-CH$_3$C$_6$H$_4$CH$_2$NH)$_4$P·X
(4-CH$_3$C$_6$H$_4$(CH$_3$)CHNH)$_4$P·X
(4-C$_2$H$_5$C$_6$H$_4$CH$_2$NH)$_4$P·X
(4-C$_3$H$_7$C$_6$H$_4$CH$_2$NH)$_4$P·X
(4-isoC$_3$H$_7$C$_6$H$_4$CH$_2$NH)$_4$P·X
(4-C$_2$H$_5$OC$_6$H$_4$CH$_2$NH)$_4$P·X
(4-C$_4$H$_9$C$_6$H$_4$CH$_2$NH)$_4$P·X
(4-CH$_3$OC$_6$H$_4$CH$_2$NH)$_4$P·X
(4-CH$_3$OC$_6$H$_4$(CH$_3$)CHNH)$_4$P·X
(4-isoC$_3$H$_7$OC$_6$H$_4$CH$_2$NH)$_4$P·X
(3-ClC$_6$H$_4$CH$_2$NH)$_4$P·X
(3-ClC$_6$H$_4$(CH$_3$)CHNH)$_4$P·X
(3-BrC$_6$H$_4$(CH$_3$)CHNH)$_4$P·X
(3-(CH$_3$)$_3$CC$_6$H$_4$CH$_2$NH)$_4$P·X
(3-CH$_3$OC$_6$H$_4$CH$_2$NH)$_4$P·X
(3-C$_2$H$_5$(CH$_3$)CHOC$_6$H$_4$CH$_2$NH)$_4$P·X
(3-CH$_3$C$_6$H$_4$(CH$_3$)CHNH)$_4$P·X The fungicidally active compounds of this invention are termed phosphorimidic triamide salts, in view of the fact that they may be considered as derived from a phosphorimidic triamide base. For example, N,N',N'',N'''-tetrakis(benzyl)phosphorimidic triamide hydrochloride having the structure $$(C_6H_5CH_2NH)_4PCl$$

is considered as derived from the base $$(C_6H_5CH_2NH)_3P{=}NCH_2C_6H_5$$

by salt formation with hydrochloric acid.

Of the compounds included in this invention, only N,N',N'',N''' - tetrakis(benzyl)phosphorimidic triamide hydrochloride is known in the literature (refer to G. M. Kosolapoff, "Organophosphorus Compounds," John Wiley & Sons, 1950, pages 330–332.

The other aralkyl phosphorimidic triamide salts of this invention are new. The biological properties of none of these structures has ever before been described.

The most general method of preparation is the reaction of the starting primary aralkyl amine with phosphorus pentachloride in accordance with the following equation, 8-AralkylNH$_2$+PCl$_5$→(AralkylNH)$_4$P+Cl$^-$
+4-AralkylH$_3$N+Cl$^-$ The literature method for the preparation of N,N',N'', N'''-tetrakis(benzyl)phosphorimidic triamide hydrochloride was by the following reaction, 4C$_6$H$_5$CH$_2$NH$_2$·HCl+PCl$_5$→(C$_6$H$_5$CH$_2$NH)$_4$PCl+8HCl The method used for the preparation of N,N',N'',N'''-tetrakis(benzyl)phosphorimidic triamide hydrochloride is given below and is typical of the preparative procedure used for the novel biologically-active compounds of this invention.

To 500 ml. of dry benzene was charged 428 g. (4.0 moles) of benzylamine and to this with cooling to about 15° C. was added 41.6 g. (0.2 mole) of phosphorus pentachloride over a period of 1¼ hours. A slurry resulted which was allowed to stand overnight at room temperature. The mixture was then heated on a steam bath for 1½ hours and was then cooled to give a solid. The solid was filtered off and oven dried to give 185 g. The solid was slurried with 1 liter of water and refiltered. The residue after drying in a vacuum oven was 74 g. It was a colorless solid melting at 203–204° C. It was a 76% yield of N,N',N'',N'''-tetrakis(benzyl)phosphorimidic triamide hydrochloride. An analytically pure sample was prepared by recrystallization from ethanol and was found to melt at 205–207° C.

The following Table I gives properties of typical hydrochloride salts prepared and includes closely related structures which are essentially non-fungicidal.

TABLE I.—PROPERTIES OF TETRAKIS(BENZYL)PHOSPHORIMIDIC TRIAMIDE HYDROCHLORIDES

| Compound | | Empirical Formula | Melting Point (° C.) | Percent Yield | Analysis | | |
|---|---|---|---|---|---|---|---|
| | | | | | Element | Percent Calcd. | Percent Found |
| | (a) Typical Fungicides of this Invention: | | | | | | |
| A | $(C_6H_5CH_2NH)_4PCl$ | $C_{28}H_{32}ClN_4P$ | 205–207 lit.[1] 208 | 76 | N | 11.41 | 11.30 |
| | | | | | P | 6.31 | 6.68 |
| | | | | | C | 70.24 | 70.4 |
| | | | | | H | 7.37 | 7.5 |
| B | $(C_6H_5(CH_3)CHNH)_4PCl$ | $C_{32}H_{40}ClN_4P$ | 241–243 | 28 | Cl | 6.48 | 6.8 |
| | | | | | N | 10.24 | 10.2 |
| | | | | | P | 5.66 | 5.7 |
| | | | | | C | 71.67 | 70.6 |
| | | | | | H | 8.02 | 7.9 |
| C | $(C_6H_5(CH_3)_2CNH)_4PCl$ | $C_{36}H_{48}ClN_4P$ | 256–259 | 57 | Cl | 5.88 | 5.7 |
| | | | | | N | 9.28 | 9.2 |
| | | | | | P | 5.14 | 5.3 |
| | | | | | C | 53.46 | 53.5 |
| | | | | | H | 4.46 | 4.6 |
| D | $(3-ClC_6H_4CH_2NH)_4PCl$ | $C_{28}H_{28}Cl_5N_4P$ | 153–155 | 28 | Cl | 28.16 | 27.9 |
| | | | | | N | 8.92 | 8.9 |
| | | | | | P | 4.93 | 4.7 |
| | | | | | C | 53.46 | 53.3 |
| | | | | | H | 4.46 | 4.5 |
| E | $(4-ClC_6H_4CH_2NH)_4PCl$ | $C_{28}H_{28}Cl_5N_4P$ | 183–185 | 45 | Cl | 28.16 | 27.9 |
| | | | | | N | 8.92 | 9.1 |
| | | | | | P | 4.93 | 4.9 |
| | | | | | C | 70.24 | 69.9 |
| | | | | | H | 7.37 | 7.5 |
| F | $(4-CH_3C_6H_4CH_2NH)_4PCl$ | $C_{32}H_{40}ClN_4P$ | 161–163 | 41 | Cl | 6.49 | 6.5 |
| | | | | | N | 10.23 | 10.2 |
| | | | | | P | 5.67 | 5.7 |
| | | | | | C | 71.67 | 71.3 |
| | | | | | H | 8.02 | 7.9 |
| G | $(4-CH_3C_6H_4(CH_3)CHNH)_4PCl$ | $C_{36}H_{48}ClN_4P$ | 200–203 | 52 | Cl | 5.88 | 6.0 |
| | | | | | N | 9.28 | 9.2 |
| | | | | | P | 5.14 | 5.3 |
| | | | | | C | 62.88 | 62.8 |
| | | | | | H | 6.59 | 6.9 |
| H | $(4-CH_3OC_6H_4CH_2NH)_4PCl$ | $C_{32}H_{40}ClN_4O_4P$ | 172–173 | 50 | Cl | 5.82 | 5.8 |
| | | | | | N | 9.17 | 9.1 |
| | | | | | P | 5.07 | 4.8 |
| | (b) Closely Related Structures: | | | | | | |
| | | | | | C | 53.46 | 53.3 |
| | | | | | H | 4.46 | 4.6 |
| J | $(2-ClC_6H_4CH_2NH)_4PCl$ | $C_{28}H_{28}Cl_5N_4P$ | 251–253 | 85 | Cl | 28.16 | 28.1 |
| | | | | | N | 8.92 | 9.0 |
| | | | | | P | 4.93 | 5.0 |
| | | | | | C | 43.87 | 43.5 |
| | | | | | H | 3.16 | 3.0 |
| K | $(2,4-Cl_2C_6H_3CH_2NH)_4PCl$ | $C_{28}H_{24}Cl_9N_4P$ | 251–253 | 86 | Cl | 41.62 | 40.4 |
| | | | | | N | 7.31 | 7.1 |
| | | | | | P | 4.04 | 4.0 |
| | | | | | C | 43.87 | 43.8 |
| | | | | | H | 3.16 | 3.4 |
| L | $(3,4-Cl_2C_6H_3CH_2NH)_4PCl$ | $C_{28}H_{24}Cl_9N_4P$ | 226–227 | 52 | Cl | 41.62 | 41.5 |
| | | | | | N | 7.31 | 7.2 |
| | | | | | P | 4.04 | 4.0 |
| | | | | | C | 78.52 | 76.8 |
| | | | | | H | 6.08 | 6.2 |
| M | $((C_6H_5)_2CHNH)_4PCl$ | $C_{52}H_{48}ClN_4P$ | 299–305 | 82 | Cl | 4.46 | 4.4 |
| | | | | | N | 7.04 | 6.0 |
| | | | | | P | 3.90 | 3.9 |

[1] See Michaelis, Ann. 326, 129 (1903).

The phosphorimidic triamide hydrochlorides are preferred since they constitute the salt which is directly isolated from the general reaction. The other salts, wherein X in formula I is a salt-forming anion other than chloride, may be made by metathetical reaction of the hydrochloride salts with metal salts of the desired anion X, e.g.

(Aralkyl NH)$_4$PCl + Metal X → (Aralkyl NH)$_4$P·X + metal chloride

Other methods for preparing (Aralkyl NH)$_4$P·X compounds are also available such as neutralization of the phosphorimidic triamide base with an HX acid. Typical of such salts are $(C_6H_5CH_2NH)_4P·Br$
$(C_6H_5CH_2NH)_4P·BF_4$
$(C_6H_5CH_2NH)_4P·I$
$(C_6H_5CH_2NH)_4P·NO_3$
$[(C_6H_5(CH_3)CHNH)_4P]_2(PO_4)_3$
$[(C_6H_5(CH_3)CHNH)_4P]_2SO_4$
$(C_6H_5(CH_3)_2CNH)_4P·O(O)CCH_3$
$(C_6H_5CH_2NH)_4P·O(O)CNHCH_3$
$(C_6H_5CH_2NH)_4P·S(S)CN(CH_3)_2$
$(C_6H_5CH_2NH)_4P·S(S)CSCH_3$
$(C_6H_5CH_2NH)_4P·S(S)COCH_3$ The compounds of this invention are useful as pesticides and, in particular, as fungicides. When so used, the compounds are usually taken up in a carrier or are formulated so as to render them suitable for subsequent dissemination as pesticides. For example, the phosphorimidic triamide salts may be formulated as wettable powders, emulsifiable concentrates, dusts, granular formulations, aerosols, and flowable emulsion concentrates. In such formulations, the compounds are extended with a liquid or solid carrier and, when desired, suitable surfactants are incorporated.

It is usually desirable, particularly in the case of foliar spray formulations, to include adjuvants, such as wetting agents, spreading agents, dispersing agents, stickers and adhesives, and the like, in accordance with usual agricultural practices. Any of the conventional wetting and dispersing agents, particularly cationic and non-ionic types, that are commonly employed in compositions for application to plants can be used. Such surfactants include polyoxyethylated alkylphenols, fatty alcohols, fatty acids, mercaptans and alkylamines; polyoxyethylene sorbitan monolaurate, alkyl quaternary ammonium salts, lignin sulfonates, fatty acid alkyd resins and salts of maleic-anhydride-diisobutylene copolymers. In some instances, the cationic phosphorimidic triamide salts may be incompatible with anionic surfactants.

The phosphorimidic triamide salts of this invention may be dissolved in a water-miscible liquid, such as methanol, ethanol, isopropanol, or dimethylformamide or mixtures of these with water and such solutions extended with water. As a general rule, the phosphorimidic triamide salts are more soluble in polar solvents than in non-polar ones. In this type of application, the concentration of the phosphorimidic triamide salt may vary from 25% to 98% with a preferred range being 50% to 95%.

For the preparation of emulsifiable concentrates, the compound may be dissolved in organic solvents, such as xylene, pine oil, orthodichlorobenzene, or methyl oleate, or a mixture of solvents, together with an emulsifying agent which permits dispersion of the pesticide in water. The concentration of the active ingredient in emulsifiable concentrates is usually 10% to 25% and, in flowable emulsion concentrates, this may be as high as 75%.

Wettable powders, suitable for spraying, may be prepared by admixing the compound with a finely divided solid, such as clays, inorganic silicates and carbonates, and silicas, and incorporating wetting agents, sticking agents, and/or dispersing agents in such mixtures. The concentration of active ingredients in such formulations is usually in the range of 20% to 98%, preferably 40% to 75%. A typical wettable powder formulation may be made by blending 50 parts of a phosphorimidic triamide salt, 40 parts of a hydrated silico aluminate, 5 parts of octylphenoxypolyethoxyethyl ether (Triton X-100) and 5 parts of sodium lignin sulfonate (Marasperse N), then comminuting. Another typical wettable powder may be made by mixing 75 parts of a phosphorimidic triamide salt, 15 parts of an attapulgite clay, 2 parts of a mixture of octylphenoxypolyethoxyethyl ether (40%) and magnesium carbonate (60%), 5 parts of Marasperse N and 3 parts of the sodium salt of a copolymer of maleic anhydride and diisobutylene (Tamol 731), then micropulverizing. A 98% wettable powder may be made by adding 340 parts of a phosphorimidic triamide salt to an aqueous solution containing 7 parts of Triton X-100 so that the resulting slurry is 30% solids. The water is then removed at 105° C. and the resulting solid micropulverized. There may be a tendency to build up charges of static electricity.

Dusts are prepared by mixing the phosphorimidic triamide salts with finely divided inert solids which may be organic or inorganic in nature. Materials useful for this purpose include botanical flours, silicas, silicates, carbonates and clays. One convenient method of preparing a dust is to dilute a wettable powder with a finely divided carrier. Dust concentrates containing 20% to 80% of the active ingredient are commonly made and are subsequently diluted to 1% to 10% use concentration.

The phosphorimidic triamide salts can be applied as fungicidal and bactericidal sprays by methods commonly employed, such as conventional high-gallonage hydraulic sprays, low-gallonage sprays, airblast spray, aerial sprays and dusts. The dilution and rate of application will depend upon the type of equipment employed, the method of application and the diseases to be controlled, but the amount is usually 0.1 lb. to 10 lbs. per acre of the active ingredient.

Numerous fungicidal evaluations have established that compounds of this invention possess outstanding fungicidal properties. This is particularly notable in view of the fact that closely related structures are essentially devoid of fungicidal activity. The following examples demonstrate the utility of these aralkyl phosphorimidic triamide salts.

EXAMPLE 1

*Slide spore germination tests*

The compounds were evaluated as fungicides in the standard slide spore germination test (cf. Phytopathology, 33, 627 (1943)), utilizing spores of *Alternaria solani*, *Monilinia fructicola* and *Stemphylium sarcinaeforme*. The values obtained for the concentration in parts per million (p.p.m.), which effectively control 50% of the spores ($ED_{50}$), are given in Table II for typical compounds.

TABLE II.—SLIDE SPORE GERMINATION FUNGICIDE TESTS

| Compound | Alternaria solani | $ED_{50}$ (p.p.m.) Monilinia fructicola | Stemphylium sarcinaeforme |
|---|---|---|---|
| A | 10–50 | <1 | 10–50 |
| B | 1–10 | <1 | 1–10 |
| C | <1 | 1–10 | 1–10 |
| D | 10–50 | <1 | 10–50 |
| E | 10–50 | 10–50 | 10–50 |
| F | <1 | <1 | <1 |
| G | <1 | <1 | 1–10 |
| H | 10–50 | <1 | 1–10 |

These data show outstanding control of three diverse types of fungi in a standard laboratory procedure.

EXAMPLE 2

*Tests on tomato anthracnose*

Representative compounds of this invention were evaluated for the control of tomato anthracnose in a persistency type test. In this test, ripe tomatoes are sprayed with a dosage series of the test compound and are then allowed to dry. The sprayed tomatoes are then subjected to a heavy fog overnight. Ten separate drops of an inoculum containing one million spores of *Colletotrichum phomoides* per milliliter are spaced on the face of each tomato and the treated fruit placed in a moist chamber at 75° to 80° F. overnight. They are then allowed to stand in a test room held at about 75° F. until lesions appear, usually about three days. Lesions on treated and untreated fruit are counted and the percent control calculated. Table III shows the results.

TABLE III.—TOMATO ANTHRACNOSE PERSISTENCY FUNGICIDE TESTS

| Compound | Percent Control at— | |
|---|---|---|
| | 2 lbs./100 gals. | 0.5 lb./100 gals. |
| A | 100 | 47 |
| B | 100 | 70 |
| C | 92 | 74 |
| D | 94 | 0 |
| E | 85 | 20 |
| F | 100 | 82 |
| G | 100 | 74 |
| H | 86 | 10 |
| J | 0 | 0 |
| K | 0 | 0 |
| L | 14 | 18 |
| M | 0 | 0 |

It will be noted that compounds A through H give excellent control of this serious disease of tomato fruit whereas compounds J through M are worthless.

EXAMPLE 3

*Tests on early and late blights of tomatoes*

Tests were run in which compounds representative of this invention were evaluated for the control of tomato early blight and tomato late blight in a persistency type test. In these evaluations, tomato plants at the four-leaf stage are sprayed to run off with suspensions of the compounds under evaluation in a dosage series and allowed to dry. They are then subjected to a heavy fog overnight and following this they are placed in an illuminated test room held at 75° F. for four days. For the early blight tests, the plants are inoculated with a suspension of 25,000–30,000 spores per ml. of *Alternaria solani*. For late blight tests, the plants are inoculated with a suspension of 30,000 spores per ml. of *Phytopthora infestans*. The spores are incubated by holding at about 52° F. and 100% relative humidity for about 22 hours. Plants are then held in an illuminated test room. In the case of the early blight tests, these lesions develop in about 42 hours. The lesions are then counted. From the counts at the different dosages $ED_{50}$ and $ED_{90}$ values are calculated; that is, the dosage in parts per million (p.p.m.) giving 50% and 90% disease control. Maneb (manganous ethylenebisdithiocarbamate), a commercial fungicide used for the control of these diseases, was included as a standard. The results are given in Table IV.

TABLE IV.—CONTROL OF TOMATO BLIGHTS

| Compound | Early Blight p.p.m. giving— | | Late Blight p.p.m. giving— | |
|---|---|---|---|---|
| | $ED_{50}$ | $ED_{90}$ | $ED_{50}$ | $ED_{90}$ |
| A | | | 111 | 1,621 |
| Maneb | | | 316 | 1,156 |
| B | 108 | 747 | 139 | 896 |
| Maneb | 140 | 729 | 266 | 1,247 |
| C | 133 | 380 | | |
| Maneb | 97 | 485 | | |
| D | 149 | 713 | 302 | 1,107 |
| Maneb | 142 | 679 | 268 | 1,141 |
| E | 219 | 938 | 520 | 2,307 |
| Maneb | 140 | 729 | 275 | 1,069 |
| F | 267 | 1,838 | 191 | 876 |
| Maneb | 142 | 679 | 347 | 1,274 |
| G | 149 | 488 | 332 | 1,025 |
| Maneb | 145 | 563 | 280 | 1,218 |
| H | | | 717 | 3,138 |
| Maneb | | | 326 | 1,267 |
| J | *NC | NC | NC | NC |
| Maneb | 140 | 581 | 347 | 1,274 |
| K | | | NC | NC |
| Maneb | | | 581 | 1,274 |
| L | | | NC | NC |
| Maneb | | | 679 | 1,267 |
| M | NC | NC | 326 | |
| Maneb | 105 | 557 | | |

¹ NC=No Control.

In almost all cases compounds A, B, C, D, E, F, G and H are at least equal to the commercial standard Maneb for the control of early and late blight of tomatoes. The closely related compounds J, K, L and M are worthless for this purpose.

EXAMPLE 4

*Tests on downy mildew on broccoli*

Greenhouse tests were run to determine the value of representative compounds of this invention for the control of *Peronospora parasitica*, the causal agent of downy mildew of broccoli and other crucifers. In this test, six-week old broccoli plants were sprayed with aqueous suspensions of the test chemicals, dried, then weathered in a fog chamber overnight. The dried plants were inoculated with an aqueous suspension of *Peronospora parasitica* sporangia containing 15,000 sporangia per milliliter and incubated at 53° F. for about 40 hours. Plants not treated with chemicals were included for check purposes. All plants were then placed on a greenhouse bench and stored at about 70° F. to allow disease lesions to develop and 6 to 8 days later the lesions were counted. Maneb, one of the commercial fungicides used to control this disease, is included as a standard. The results are given in Table V.

It may be seen that with the possible exception of Compound H, the first eight compounds in the above table gave quite respectable control of this downy mildew disease and compared favorably with the commercial standard. Compounds J, K, L and M were worthless.

EXAMPLE 5

*Control of downy mildew on grapes*

In this test, grape seedlings or vegetative cuttings of the variety Sylvaner Riesling are grown to the four-five leaf stage. Test compounds are made up at 500 p.p.m. and are sprayed onto the grape foliage in a dosage series. After the plants have dried, they are inoculated with a sporangia suspension of *Plasmopara viticola*. The plants are allowed to stand in an illuminated chamber which is constantly fogged at about 25° C. for five to seven days in order for the fungus to develop. Readings are then made of the percent leaf area infected and are compared with those plants receiving no treatment. In these tests, the percent area infected for untreated plants was in the range of 70 to 85%. For comparative purposes, plants treated with Maneb as the commercial standard were included. The results are kiven in Table VI.

TABLE VI.—CONTROL OF DOWNY MILDEW ON GRAPES

| Compound | Percent Leaf Area Infected At— | |
|---|---|---|
| | 500 (p.p.m.) | 10 (p.p.m.) |
| B | 0 | 42 |
| Maneb | 0 | 18 |
| C | 0 | 0 |
| Maneb | 0 | 2.5 |
| D | 0 | 50 |
| Maneb | 0 | 18 |
| F | 1.2 | 62.5 |
| Maneb | 0 | 18 |
| H | 0 | 42.5 |
| Maneb | 0 | 18 |
| M | 60 | 77 |
| Maneb | 0 | 18 |
| Untreated | 70–85 | |

With the exception of compound M, the above table shows that the compounds of this invention have given excellent control of downy mildew of grapes at a dosage which is practical for commercial use.

EXAMPLE 6

*Tests on apple scab*

Representative phosphorimidic triamide salts of this invention were evaluated for the control of apple scab, the causal agent for which is *Venturia inaequalis*, in a protective type test. In this test, apple seedlings at the 4 to 5 leaf stage ar sprayed with the test chemical at concentrations of one-fourth and one-eighth pound per one hundred gallons of spray and then allowed to dry. There are four plants per treatment. The plants are then inoculated with a conidial suspension of *Venturia*

TABLE V.—CONTROL OF PERONOSPORA PARASITICA

| Compound | No. of lesions at 100 (p.p.m.) | | | Percent Disease Control With | |
|---|---|---|---|---|---|
| | Compound Treated | Maneb Treated | Untreated | Compound | Maneb |
| A | 73 | 75 | 244 | 70 | 69 |
| B | 54 | 52 | 244 | 78 | 79 |
| C | 3 | 28 | 97 | 97 | 71 |
| D | 51 | 59 | 147 | 65 | 60 |
| E | 22 | 66 | 304 | 93 | 78 |
| F | 33 | 31 | 138 | 76 | 78 |
| G | 74 | 74 | 253 | 71 | 71 |
| H | 60 | 9 | 120 | 50 | 93 |
| J | 151 | 36 | 177 | 11 | 80 |
| K | 146 | 54 | 147 | ¹NC | 64 |
| L | 135 | 31 | 138 | NC | 78 |
| M | 247 | 70 | 261 | 10 | 62 |

¹NC=No Control.

*inaequalis* containing 30,000 spores fer milliliter. The inoculated plants are then incubated overnight at 65° F. in high-humidity chambers. Thereafter they are held in the greenhouse at 70° F. until apple scab lesions appear 8 to 11 days later. The percent control of the apple scab is calculated from the number of lesions on treated plants and those on untreated controls. The percent disease control is given below in Table VII.

TABLE VII.—PROTECTIVE APPLE SCAB FUNGICIDE TEST

| Compound | Percent Control of Apple Scab at— | |
| --- | --- | --- |
| | 0.25 lb. | 0.125 lb. |
| A | 50 | 45 |
| B | 89 | 78 |
| D | 81 | 56 |
| E | 50 | 47 |
| G | 76 | 62 |

The dosages used in these tests were much lower than would be employed for commercial control in orchards, and yet, even at these very low dosages, good control of the apple scab disease was achieved.

Field tests involving the diseases given above in the examples, as well as on celery early blight (*Cerospora apii*), downy mildew of cucumber (*Pseudoperonospora cubensis*), bacterial spot of peppers (*Xanthomonas vesicatoria*) and bacterial spot of peaches (*Xanthomonas pruni*) have demonstrated that representative compounds of this invention give good to excellent control of a variety of economically important diseases.

In order to be practical for commercial use, such fungicides and agricultural bactericides must be low in phytotoxic characteristics, and in this regard the compounds of this invention have favorable properties. The aralkyl phosphorimidic triamide salts of this invention are particularly safe on cucurbits and grapes, plants which are often injured by the commonly used fungicides.

Certainly, when the aralkyl phosphorimidic triamide salts of this invention are used on foliage, it is preferred that they be relatively non-phytotoxic. The choice of the anion X, as given in the general Formula I, may, in part, influence the phytotoxicity. It is desirable to choose an anion X which is relatively innocuous and does not contribute to phytotoxicity. Since each variety of plant has different characteristics with regard to phytotoxicity, X would be chosen on the basis of tests on the particular type of plant involved.

Preferred compounds of this invention for choice as the active ingredients in fungicidal compositions, which combine high fungitoxicity accompanied by low phytotoxic characteristics, are those derived from benzyl amines, i.e.

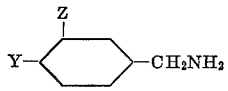

and α-methylbenzyl amines, i.e.

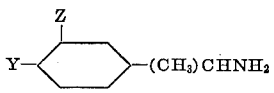

wherein Z and Y have the meanings given above. The preferred substituents for Y and Z are hydrogen, chlorine, methyl and methoxy.

The compositions of this invention may be used alone or in combination with other known biologically-active materials, such as insecticides, miticides, agricultural bactericides, fungicides, and the like.

The aralkyl phosphorimidic triamide salts of this invention constitute new structures which are particularly valuable as the active ingredients in fungicidal compositions. They combine high fungitoxicity and low phytotoxicity and are therefore of major importance on agricultural and horticultural crops. They have demonstrated excellent control on a number of fungous diseases and thus possess a wide spectrum of activity.

This invention constitutes a major contribution to the field of plant pathology and a new weapon for the plant pathologist's use.

We claim:

1. A method for controlling phytopathogenic fungi and bacteria comprising applying to the loci to be protected in an effective amount a fungicidal and bactericidal composition comprising a carrier and a phosphorimidic triamide salt having the formula

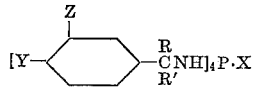

wherein
R and R' are individually selected from the class consisting of hydrogen and methyl,
Y is selected from the class consisting of hydrogen, chlorine, bromine, lower alkyl and lower alkoxy;
Z is hydrogen; and when
Y is hydrogen, Z is selected from the group consisting of hydrogen, bromine, chlorine, lower alkyl and lower alkoxy; and
X is a salt-forming anion.

2. A method for controlling phytopathogenic fungi and bacteria according to claim 1 which comprises applying to foliage said fungicidal and bactericidal composition in a spray.

3. A method for controlling phytopathogenic fungi and bacteria according to claim 1 wherein said phosphorimidic triamide salt is (Phenyl CH₂NH)₄P·Cl 4. A method for controlling phytopathogenic fungi and bacteria according to claim 1 wherein said phosphorimidic triamide salt is (Phenyl(CH₃)CHNH)₄P·Cl 5. A method for controlling phytopathogenic fungi and bacteria according to claim 1 wherein said phosphorimidic triamide salt is (Phenyl CH₃)₂CNH)₄P·Cl 6. A method for controlling phytopathogenic fungi and bacteria according to claim 1 wherein said phosphorimidic triamide salt is

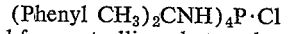

7. A method for controlling phytopathogenic fungi and bacteria according to claim 1 wherein said phosphorimidic triamide salt is

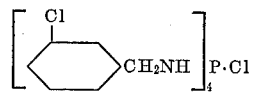

8. A method for controlling phytopathogenic fungi and bacteria according to claim 1 wherein said effective amount is in the range of 0.1 lb. to 10 lbs. of said phosphorimidic triamide salt per acre.

References Cited by the Examiner

UNITED STATES PATENTS 2,730,547  1/1956  Dye _____ 167—30

OTHER REFERENCES

Hanson, H. N., Ph. D.: Dissertation, "Tetraamidophosphonium Compounds," University of Cincinnati (1963), University Microfilms, Inc., Ann Arbor, Michigan.

Hart, W. A., and Sissher, H. N.: J. Inorg. Chem. 3 (1964), page 617.

Kosolapoff, G. M.: Organophosphorus Compounds, John Wiley & Sons (1950), pages 330–332.

Michaelis, A.: Ann., 326 (1903), pages 151–152.

JULIAN S. LEVITT, *Primary Examiner.*

STANLEY J. FRIEDMAN, *Assistant Examiner.*